United States Patent [19]

Bitsche

[11] Patent Number: 5,585,681
[45] Date of Patent: Dec. 17, 1996

[54] LIQUID-COOLED DRIVE UNIT FOR AN ELECTRIC MOTOR VEHICLE

[75] Inventor: Otmar Bitsche, Graz, Austria

[73] Assignee: Steyr-Daimler Puch AG, Vienna, Austria

[21] Appl. No.: 250,871

[22] Filed: May 27, 1994

[30] Foreign Application Priority Data

May 28, 1993 [AT] Austria ..................... 1050/93

[51] Int. Cl.$^6$ .......................... H02K 11/00; H02K 9/19
[52] U.S. Cl. .......................... 310/54; 310/68 R
[58] Field of Search .......................... 310/52, 54, 58, 310/59, 64, 68 R, 67 R; 180/65.1, 65.5, 65.8, 65.6

[56] References Cited

U.S. PATENT DOCUMENTS

| | | | |
|---|---|---|---|
| 3,733,503 | 5/1973 | Potter | 310/54 |
| 5,331,239 | 7/1994 | Kwun et al. | 310/68 R |
| 5,491,370 | 2/1996 | Schneider et al. | 310/54 |

FOREIGN PATENT DOCUMENTS

| | | |
|---|---|---|
| 0208219 | 1/1987 | European Pat. Off. . |
| 3442350 | 6/1986 | Germany . |
| 3545665 | 7/1987 | Germany . |
| 3941474 | 6/1991 | Germany . |

Primary Examiner—Clayton E. LaBalle
Attorney, Agent, or Firm—Meltzer, Lippe, Goldstein

[57] ABSTRACT

A drive unit for an electric motor car comprises an electric motor attached to a transmission unit, a housing for the electric motor, a control housing within which are electronic controls for the electric motor, and a cooling circuit having a cooling liquid flowing therethrough. The control housing has a bottom which is located on top of the motor housing. The cooling circuit has a first portion which cools the bottom of the control housing, and a second portion which cools the motor housing. The first and second portions of the cooling circuit are connected in series so that the cooling liquid can first cool the bottom of the control housing and then the motor housing.

9 Claims, 5 Drawing Sheets

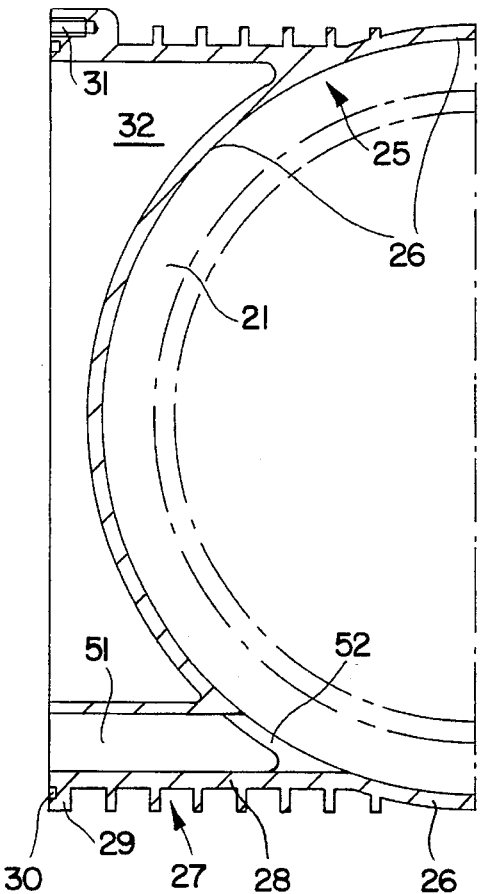
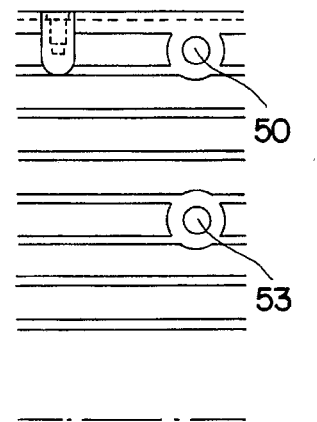
FIG. 8
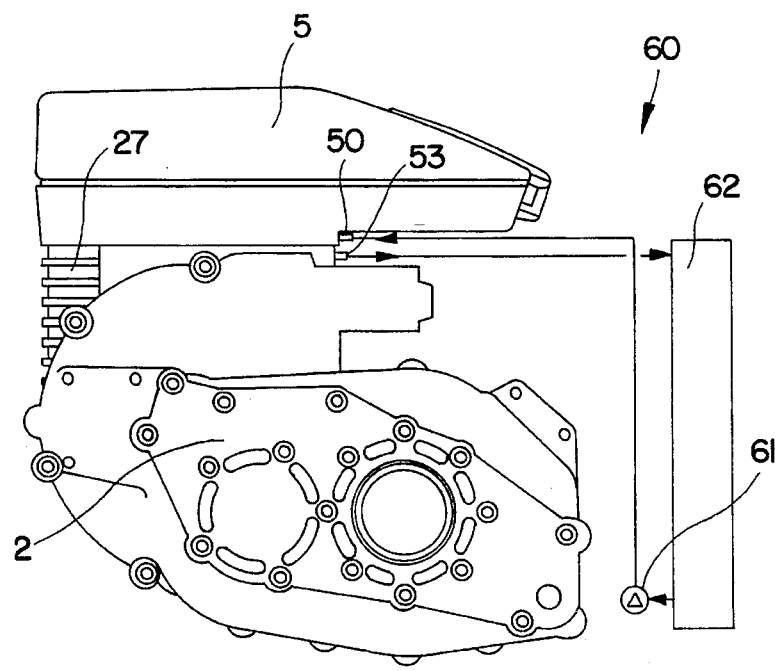
FIG. 7
FIG. 9

LIQUID-COOLED DRIVE UNIT FOR AN ELECTRIC MOTOR VEHICLE

BACKGROUND OF THE INVENTION

The invention relates to a drive unit for an electric motor car which drive unit comprises an electric motor attached to a transmission unit, a housing for the electric motor through which a cooling liquid flows, and a control housing.

In electric motor cars liquid cooling is advantageous in spite of the cost involved because such cooling makes for low vehicle weight thanks to light-weight motors with high energy density. Liquid cooling also facilitates incorporation of the electric motor in the interior of the vehicle.

From practical experience, e.g., in crane construction, it is a known technique to design electrical motors with housings through which a cooling liquid flows. The output range of such motors is usually high and they are controlled from a control cabin in which the very voluminous controls are also located.

Electric motor car motors are relatively small. Their control, however, is very complicated so that they will meet all the requirements of operation (e.g., output control, control of rotational speed and direction of rotation, regenerative braking, battery charging, switching gears if these are provided, etc.).

These control operations are accomplished today using space-saving solid state output rectifying devices and control processors. Because of the high energy density of the power electronics and the thermal sensitivity of the processors, it is a general practice to distribute the controls at different locations within the motor space and to install the power electronics at a location receiving a generous amount of cooling air. This requires long and vulnerable (due to possible oscillations) connection lines. Despite these measures, cooling remains unsatisfactory while accessibility for diagnosis and repair is poor.

DE-OS 39 41 474 teaches to place the rectifier zones of a generator built into a liquid-cooled receiving cavity of a combustion engine within that area or in an adjacent area. A rectifier operates well at the cooling water temperature of the combustion engine. This temperature of approximately 80° C. is unacceptable, however, for a control processor which controls the motor of an electric motor car.

It is therefore the object of the instant invention to construct a drive unit for an electric motor vehicle having a control processor in a compact and nevertheless thermally stable manner.

SUMMARY OF THE INVENTION

According to the invention this is achieved in a drive unit for an electric motor car comprising an electric motor attached by flange to a transmission unit, a housing for the electric motor through which a cooling liquid flows, and a housing for the controls which is attached on top of the electric motor housing. The bottom of the control housing is set on the housing of the electric motor and is also cooled by the cooling liquid, the bottom of the control housing being connected in series for liquid passage to the motor housing and being traversed first by the liquid. Motor and control housing together with all the control elements are thus combined into one unit. In this manner, many cable connections can be omitted and a drive unit is provided which can be installed in the vehicle in only a few steps. This is possible thanks to the inclusion of the controls into the cooling circuit, whereby the connection in series ensures that the most delicate parts—which themselves usually produce little heat—are installed at the coolest locations and the motor is nevertheless intensively cooled.

In a preferred embodiment, the motor housing comprises an inner body with guide ribs, and a jacket for the inner body, with the jacket formed as one piece with the bottom of the control housing. The bottom of the control housing is connected to the space between the jacket and the inner body through an opening in the jacket. Thus, the jacket together with the bottom of the control housing can be designed as a simple cast part surrounding the guide ribs of the inner body, thereby constituting the cooling channel for cooling the motor. The liquid which first cools the bottom of the control device can pass through the opening into the motor housing without pipelines and with a minimum loss of pressure.

In an advantageous embodiment, the inner body is provided near its ends with circumferential grooves to receive a sealing ring and with a collar serving as a stop in axial direction for the enveloping tube near one front end. Good tightness is thus achieved by simple means.

In a further development of the invention, the motor housing, in addition to the collar, is provided with at least one radial channel to receive electric connection cables. Thus no loose connection cables exist any longer between control device and motor, and this further increases operating safety. Free-lying cables are exposed with the vibrations that always occur in a vehicle and represent a danger in case of collision.

Finally, it also practical to include a heat exchanger for the vehicle heating system in the cooling liquid circuit in addition to the drive unit. The comprehensive effect of the cooling system according to the invention causes all of the dissipated heat to be removed by the cooling liquid and to be used fully to heat the vehicle. The energy for this would otherwise be taken from the storage battery, and this would be at the cost of the always precarious range of the vehicle.

BRIEF DESCRIPTION OF THE DRAWINGS

The invention is explained below through drawings of an embodiment, wherein

FIG. 7 shows a cross-section taken along AA in FIG. 3;

FIG. 8 shows detail X of FIG. 6; and

FIG. 9 shows a schematic lateral view of the drive unit with the cooling circuit.

DETAILED DESCRIPTION OF A PREFERRED EMBODIMENT

Figure 1:
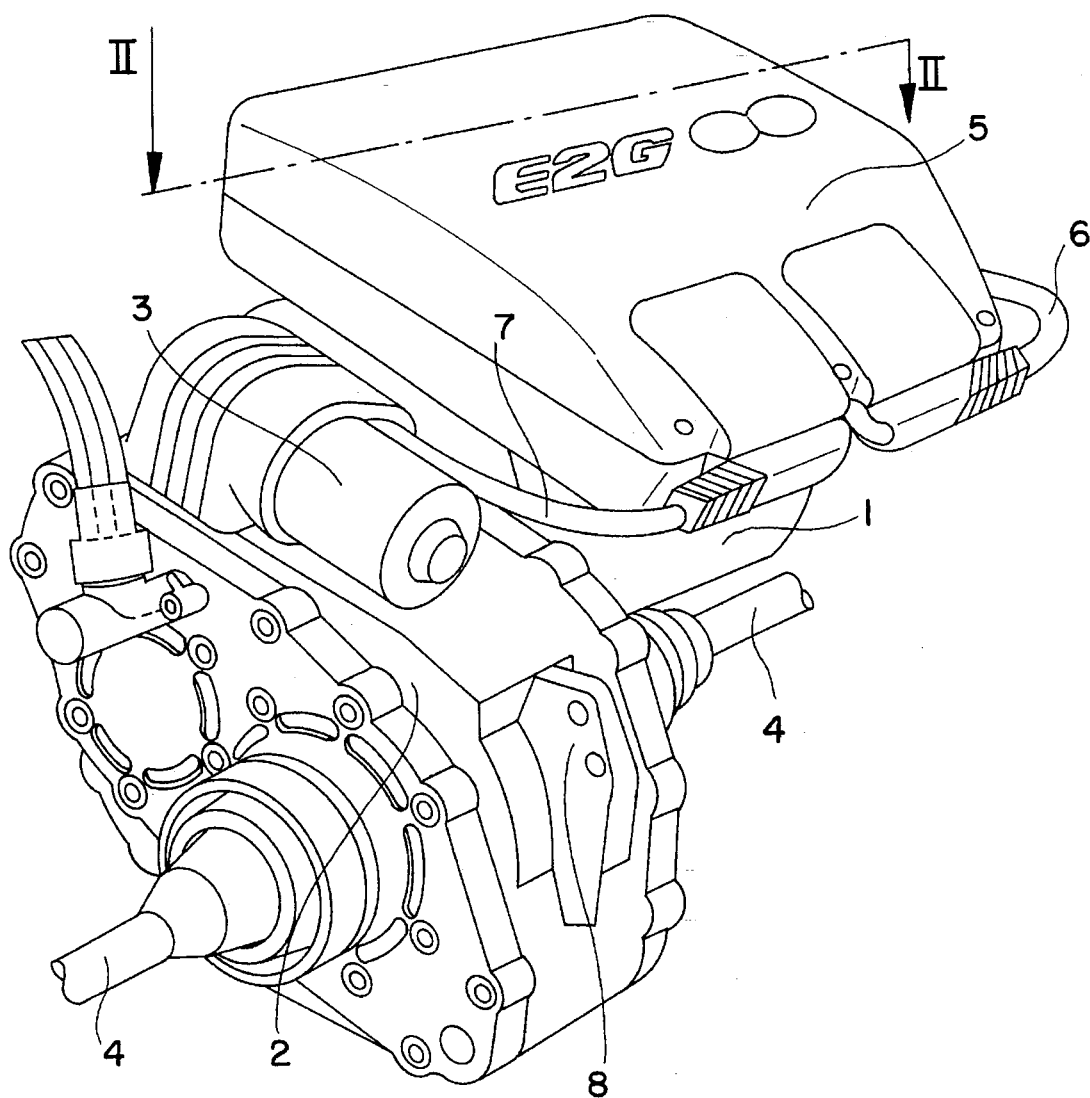
FIG. 1 is a perspective view of the inventive drive unit.

The inventive drive unit shown in FIG. 1 comprises an electric motor 1 attached by a flange to a transmission unit 2 and a control housing 5 located above them and partially covering the electric motor 1. A signal and control cable 6 leads into the control housing 5. Power supply cable and storage battery are not shown here. A cable 7 establishes the connection to a shift actuator 3 of the transmission unit 2. The wheel drive shaft 4 and a lug 8 for the attachment of the drive unit in the vehicle are only suggested.

Figure 2:
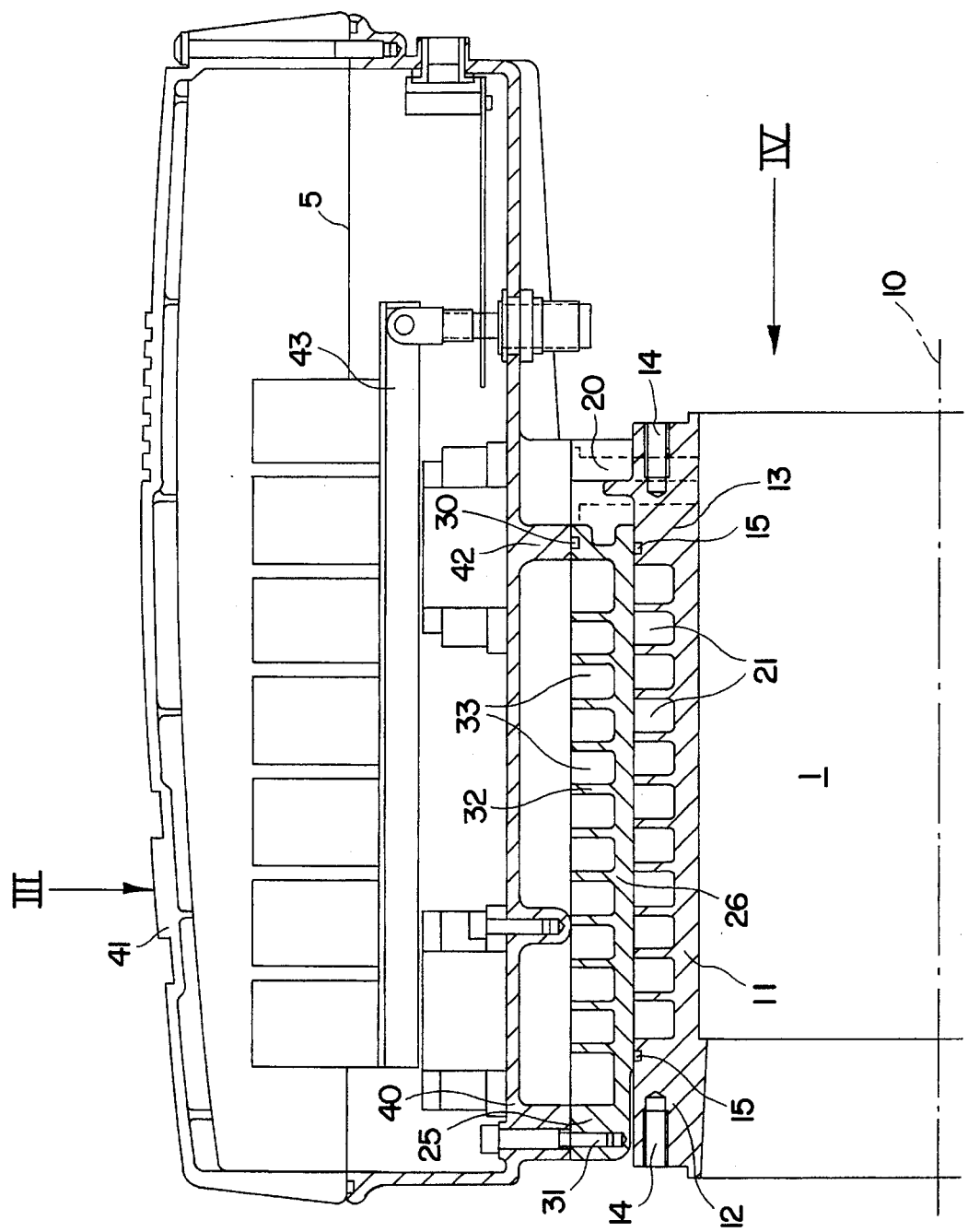
FIG. 2 shows a vertical longitudinal section taken along II—II of FIG. 1.
Figure 4:
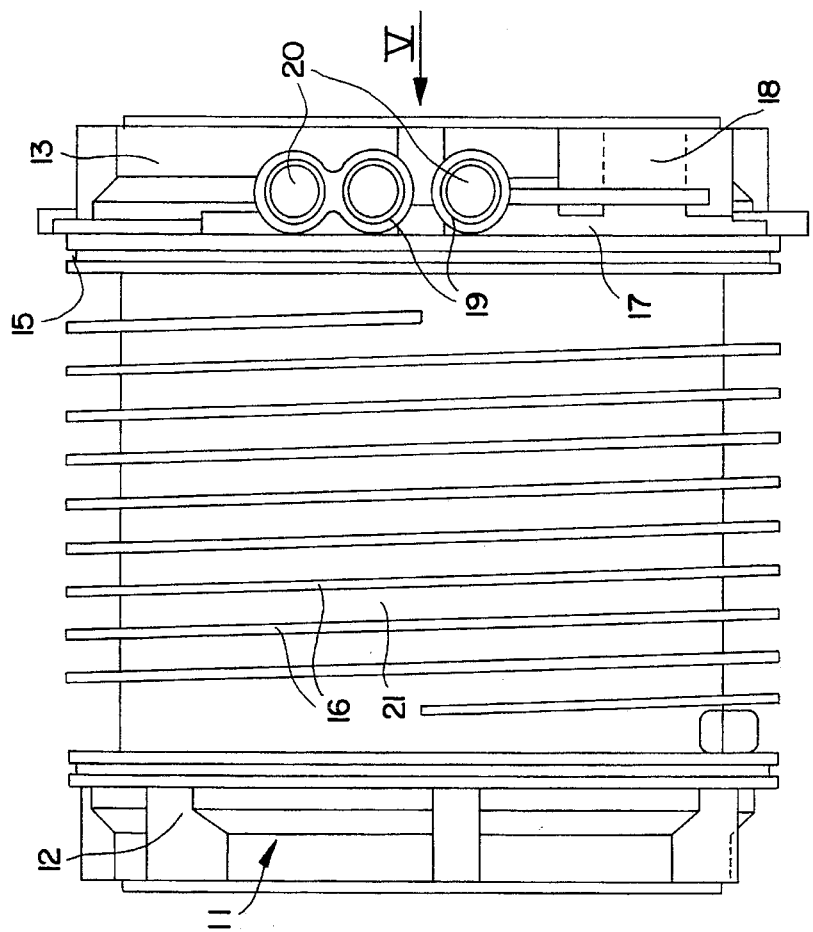
FIG. 4 shows a top view of the electric motor as shown in FIG. 3, but with the jacket removed.
Figure 5:
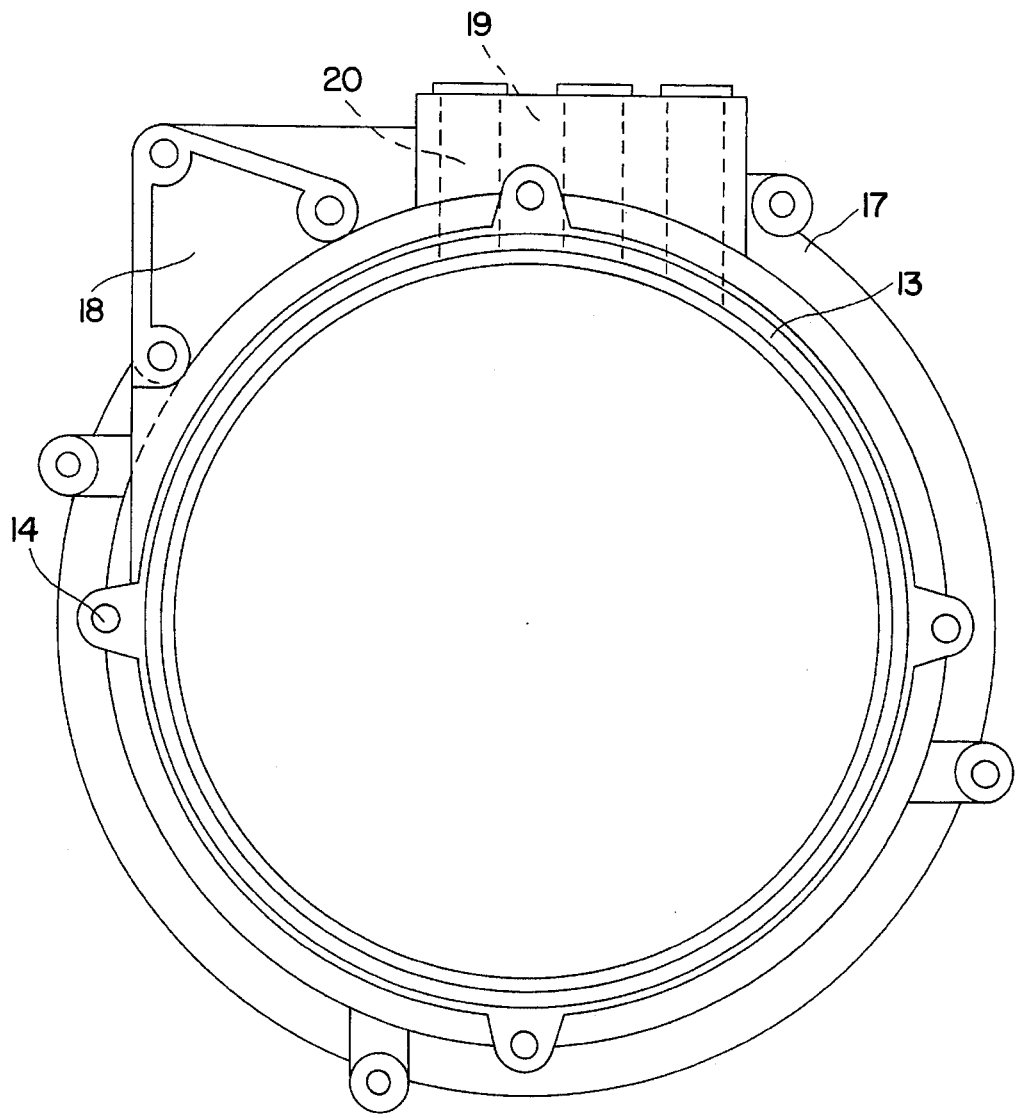
FIG. 5 shows a front view according to V in FIG. 4.

In the longitudinal section through the motor shown in FIG. 2, the motor axis is indicated and bears reference number 10. The electric motor 1 according to the invention comprises a cylindrical inner body 11 (stator windings and rotor are omitted for the sake of simplification) which is delimited in axial direction by a left side flange 12 for connection to the transmission unit 2 and by a right side flange 13 for attachment to a bearing plate which is not shown. The threaded bores 14 on both sides are provided to connect the two flanges 12, 13 to the adjoining parts. On the outer circumference of each of the two flanges 12, 13 is a groove 15 to receive a sealing ring. A stop collar 17 is formed on the right flange 13 (see FIGS. 2, 4 and 5). A spiral-shaped guide rib 16 extends between the flanges 12,13 (FIG. 4). The right flange 13 is furthermore provided with an attachment console 18 and a connecting piece 19 (both shown in FIG. 4) containing the channels 20 to receive electric connecting cables between electric motor 1 and control housing 5. The guide rib 16 defines a first cooling channel 21 (FIGS. 2, 4) on the outer circumference of the inner body 11 of electric motor 1.

Figure 3:
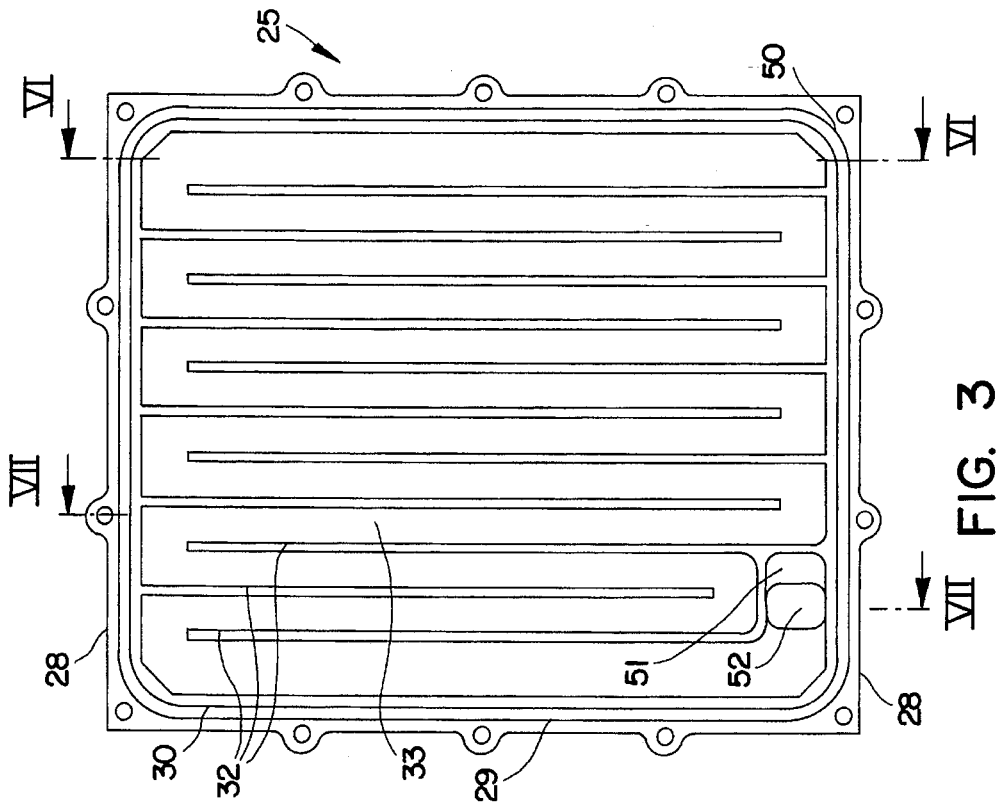
FIG. 3 shows a top view of the electric motor according to the invention with the control housing removed, the motor parts below not being shown.

The inner body 11 of the motor is surrounded by jacket 25 (FIGS. 2, 7). This jacket 25 consists of a circumferential wall 26 which delimits the first cooling channel 21 of the inner body 11 towards the outside. This circumferential wall 26 is sealed off from the inner body 11 by sealing rings placed in grooves 15 and is fixed in axial direction by the stop collar 17 on the inner body 11. A cooling saddle 27 with lateral walls 28 is formed on the upper portion of the jacket 25 and ends in a plane rectangular flange 29 with a sealing groove 30 and a bore 31. Guiding walls 32 (FIG. 3) defining a second cooling channel 33 (FIGS. 2, 3) are provided on the inside of the cooling saddle 27.

A control housing bottom 40 is sealingly screwed to the rectangular flange 29 of the cooling saddle 27 (See FIG. 2) and is equipped with a rectangular flange 42 for that purpose. A chassis 43 is screwed on the control housing bottom 40 and supports all the electronics which are only suggested here. A control housing cover 41 is then sealingly screwed onto the control housing bottom 40.

Figure 6:
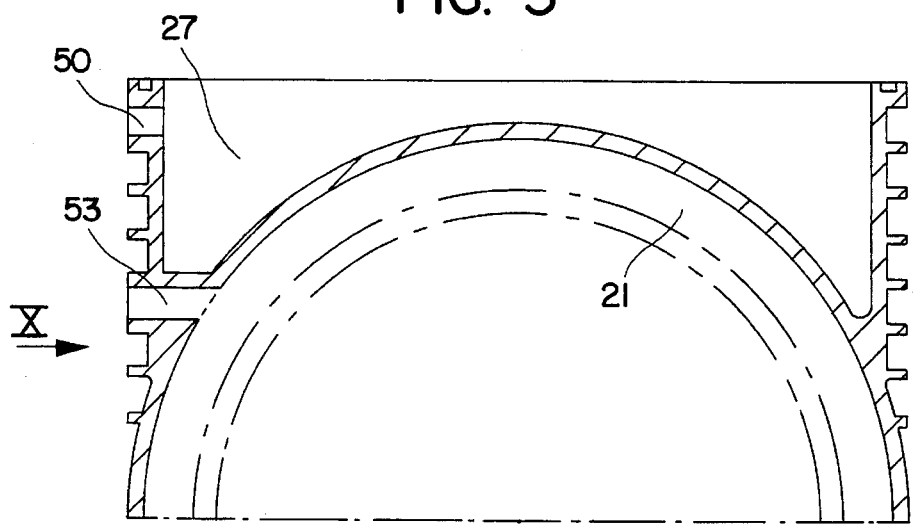
FIG. 6 shows a cross-section taken along BB in FIG. 3.

The cooling circuit will now be described by references to FIGS. 3, 6, 7 and 8. A cooling liquid, generally water, enters at 50 (FIGS. 3, 6) into the cooling saddle 27. There it flows through the snake-shaped second cooling channel 33 defined by the guiding walls 32 of cooling saddle 27, whereby it passes over the control housing bottom 40. The liquid then flows through shaft 51 (FIG. 7) and through an opening 52 in the jacket 25 into the first cooling channel 21 and flows in spiral form around the inner body 11 of the motor, effectively cooling the latter. It then emerges through the cooling water outlet connection 53 (FIGS. 6, 8).

The outer cooling circuit 60 is shown schematically in FIG. 9. The cooling water which leaves the drive unit through the cooling water outlet connection 53 flows into a heat exchanger 62 in which it transmits the dissipated heat to the vehicle heating system. It is then again pumped by a cooling water pump 61 to the cooling water inlet connection 50.

While the invention has been described by reference to specific embodiments, this was for purposes of illustration only. Numerous alternative embodiments will be apparent to those skilled in the art and are considered to be within the scope of the invention.

We claim:

1. A drive unit for an electric motor car, comprising an electric motor, a housing for said electric motor, a control housing within which are electronic controls for said electric motor, said control housing having a bottom, said bottom being located on top of said motor housing, and a cooling circuit having a cooling liquid flowing therethrough, said cooling circuit having a first portion which cools the bottom of said control housing and a second portion which cools the motor housing, said first and second portions of said cooling circuit being connected in series so that said cooling liquid passes through said first portion of said cooling circuit to cool said control housing before passing through said second portion of said cooling circuit to cool said motor housing.

2. The drive unit of claim 1 wherein said motor housing comprises an inner body having guide ribs formed therein and a jacket which surrounds said inner body, said guide ribs defining a first cooling channel forming said second portion of said cooling circuit.

3. The drive unit of claim 2 wherein said jacket is integral with said control housing bottom.

4. The drive unit of claim 3 wherein said jacket includes a cooling saddle defining a second cooling channel forming said first portion of said cooling circuit, said first and second cooling channels being connected through an opening in said jacket.

5. The drive unit of claim 4 wherein said inner body has first and second end flanges, said first end flange including a circumferential groove for receiving a sealing ring.

6. The drive unit of claim 4 wherein said inner body includes a collar adjacent said second end flange, said collar acting as a stop in an axial direction for said jacket.

7. The drive unit of claim 6 wherein said inner body includes a radial channel outside said collar for receiving a cable connecting said control electronics with said electric motor.

8. The drive unit of claim 1 wherein said cooling circuit further comprises a heat exchanger.

9. The drive unit of claim 1, wherein said electric motor is attached to a transmission unit.

\* \* \* \* \*